March 7, 1967 H. S. HALSALL 3,307,664

OVERLOAD RELEASE CLUTCH WITH LOCK OUT MEANS

Filed Feb. 25, 1965 2 Sheets-Sheet 2

INVENTOR
HAROLD STANLEY HALSALL
BY
Pennie, Edmonds, Morton, Taylor & Adams
ATTORNEYS

United States Patent Office 3,307,664
Patented Mar. 7, 1967

3,307,664
OVERLOAD RELEASE CLUTCH WITH LOCK OUT MEANS
Harold S. Halsall, Newbold, Chesterfield, England, assignor to Kennedy Van Saun Mfg. & Eng. Corporation, New York, N.Y., a corporation of Delaware
Filed Feb. 25, 1965, Ser. No. 435,118
Claims priority, application Great Britain, Mar. 2, 1964, 8,740/64
6 Claims. (Cl. 192—56)

This invention relates to improvements in mechanical transmissions of the kind embodying an overload release mechanism. Such a transmission is applicable to a rotary drive for crushers reducing stone, rock or ore and which protects the crushers from damage for any reason which could cause a harmful build up of torque.

According to this invention a mechanical transmission of the kind referred to is characterized in that the overload release or disengageable coupling mechanism comprises a driver means which during transmission of a safe load is accommodated partly in each of two opposed sockets provided respectively in two relatively rotatable and coaxially mounted members of the transmission at a distance away from the axis of rotation and which locks those members together, whereby a drive may be transmitted. In this structure the driver means has a rounded portion located in one of the sockets, the mouth of which socket is so shaped that when a drive is being transmitted by the driver means the reaction force between it and said shaped mouth tends to move the driver means out of said socket into the other socket which is adapted to accommodate the whole or the greater part thereof, but which movement out of said one socket is opposed by a yieldable detent which is subject to the aforesaid reaction force. At a predetermined value of that force the detent yields permitting the driver means to move out of said one socket and uncouple said members.

In a preferred construction the driver means comprises a ball and the yieldable detent may comprise a ball which is constrained to move, and which is urged by spring means, in a direction transverse to the direction of movement of the driver ball and normally obstructs its movement out of the one socket and into said other socket.

The spring means acting upon the detent ball preferably provides sufficient frictional resistance between the balls to dissipate a large proportion of the kinetic energy of the driver ball on disengagement.

The detent ball may be supported in a cup-shaped depression seat at the outer end of a spring pressed plunger which forces the detent ball into engagement with the driver ball, the arrangement being such that the movement of the driver ball out of the first socket towards the other socket tends to rotate both balls, which rotation is opposed by the frictional engagement between the detent ball and said cup-shaped seat and between the two balls themselves, whereby the kinetic energy of the detent ball by reason of its comparatively rapid movement towards the other socket, is largely absorbed.

The aforesaid sockets may be so shaped and disposed that the action of centrifugal force on the detent ball results in a reaction force between it and the shaped mouth of the first socket tending to move the ball towards the other socket.

The first socket may be formed with a truncated conical surface tapering inwardly from the mouth thereof, the cone angle of which is so selected that relative rotation between the two members tends to move the driver ball from the first to the second socket.

In one construction according to the invention the two sockets are arranged respectively in opposed closely adjacent faces of said two relatively rotatable members which faces extend transversely to the axis of rotation. In such an arrangement the center of the driver ball when transmitting a drive is preferably disposed on the outside of a plane containing the mouth of the first socket. Thus the centrifugal force, the shape of the mouth of the first socket and the location of the center of the driver ball contribute to the movement of the ball towards the other socket.

In the case where said detent comprises a spring pressed ball this detent ball is arranged on that side of said other socket which is nearer the aforesaid axis of rotation and is movable radially with respect thereto. The opposite side of said other socket has a groove or recess, the bottom of which is inclined away from the axis of rotation as it extends away from the mouth of said socket, along which groove the driver ball may move under the action of the centrifugal force so that the whole or greater part of the ball is located in said other socket.

Said other socket may be so shaped that, when the whole or greater part of the driver ball has entered it and said members are uncoupled, the ball is retained therein by the spring pressed detent ball.

Means may be provided in the member containing said other socket for gaining access to the driver ball, for the purpose of returning it to its driving position when the sockets have been brought into register. Said two relatively rotatable members or parts movable therewith may be provided with indicating means for facilitating the bringing of the two sockets into register.

The following is a more detailed description of one embodiment of the invention as illustrated in connection with a drive mechanism for a stone or rock crusher, reference being made to the accompanying drawings in which.

Figure 2:
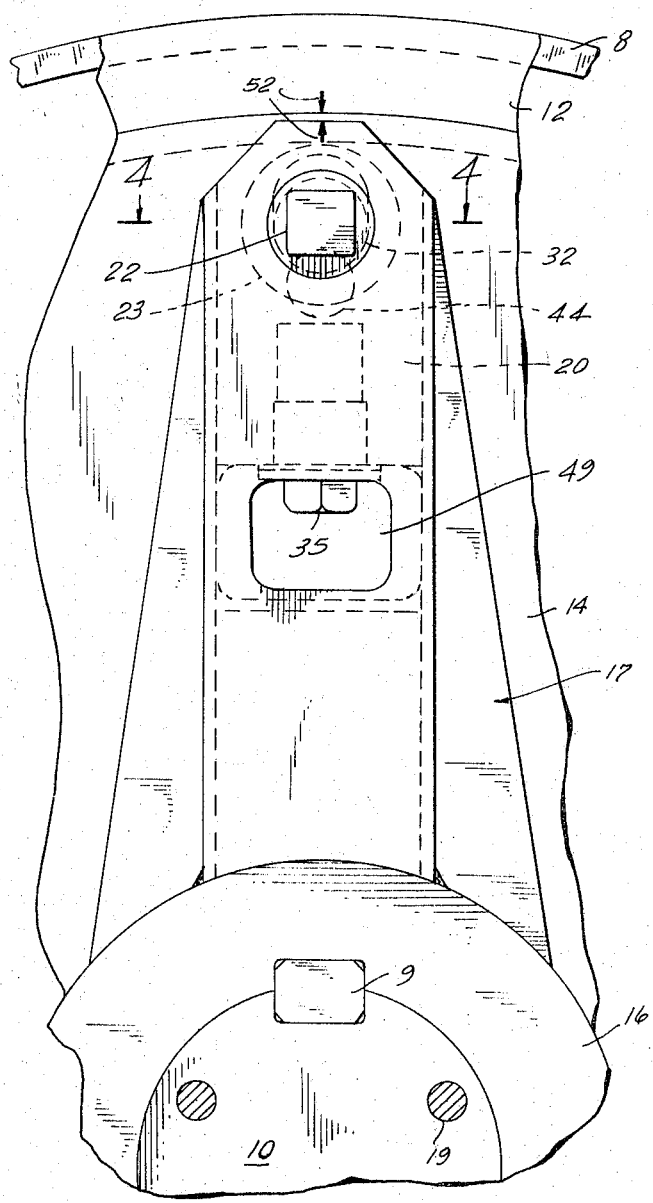
FIG. 2 is a view looking from the left of FIG. 1 and showing only a part of the driving wheel.

In the drawings, in which parts are broken away, a main driving shaft 10 for the crushing mechanism is shown supported in bearings, a part of one of which is shown at 11. The shaft 10 is driven through a mechanical overload release transmission by a driving wheel in the form of a fly wheel having a rim portion 12 formed with V-grooves 13 for receiving driving belts 8 (FIG. 2). The rim of the fly wheel is attached to a disc like web 14 which in its turn is attached to a hub 15 rotatable on one end portion of a boss 16 keyed to the shaft 10 by a key 9. The boss 16 is retained on the end portion of the shaft by a plate 18 engaging an end face of the boss 16 and secured to the shaft by screws 19. A stout built-up driving arm 17, fixed to the outer portion of the boss 16, extends radially outwards from the boss along the web 14, as shown. The driving arm 17 and the web 14 (or the fly wheel) comprise the said relatively rotatable members.

The rim 12 of the fly wheel overlies the outer end of the arm 17, which outer end embodies a block 20 in which is formed a socket 21, one side of which is provided with an opening closed by a removable screw threaded plug 22. The other open side of the socket has secured within it a hard metal ring 23 having an open mouth facing web 14. The inner periphery of the ring 23 is for the most part cylindrical to its mouth but a part thereof nearer the extremity of the arm 17 is formed with a groove 24 having an inclined bottom wall which joins an inclined wall 25 on one side of the socket. A complementary inclined wall 26 is formed on the other side of the socket.

The disc like web 14 is formed with a stepped hole 27 which accommodates and in which is secured a hard metal socket member 28 having a closed end wall 29 and forming a socket 50. The internal face of the peripheral wall 30 of the socket member 28 is formed with a truncated conical surface 31 tapering inwardly from the open mouth of the socket member.

Figure 4:
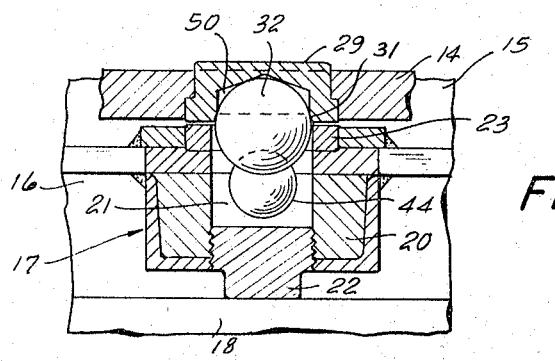
FIG. 4 is a sectional view on the line 4—4 of FIG. 2.

The sockets 21 and 50 between them, when a drive is being transmitted, accommodate a hard metal driver ball 32 which contacts with the end wall 29 of the socket member 28 and with the truncated conical surface 31. In this position the center 33 of the ball 32 is disposed outside the plane of the open mouth of the socket member 28 and slightly inside the mouth of the ring 23 of the socket 21, which mouths are related and are in register as shown in FIGS. 1 and 4.

The block 20 is formed with a radially extending stepped bore 34, the end nearer the axis of rotation being screw threaded to receive a threaded plug 35. Access to the hollow plug 35 may be gained through holes 48, 49 formed respectively in the disc like web 14 and arm 17.

Reciprocable in the bore 34 is a hollow plunger 36. A number of spring washers 39 are disposed between an inner face of the plunger 36 and a cross member 38 secured to the hollow plug 35. The upper end of the hollow plunger 36 is formed with a part spherical recess or seat 43 which accommodates a detent ball 44 smaller than the ball 32.

Figure 1:
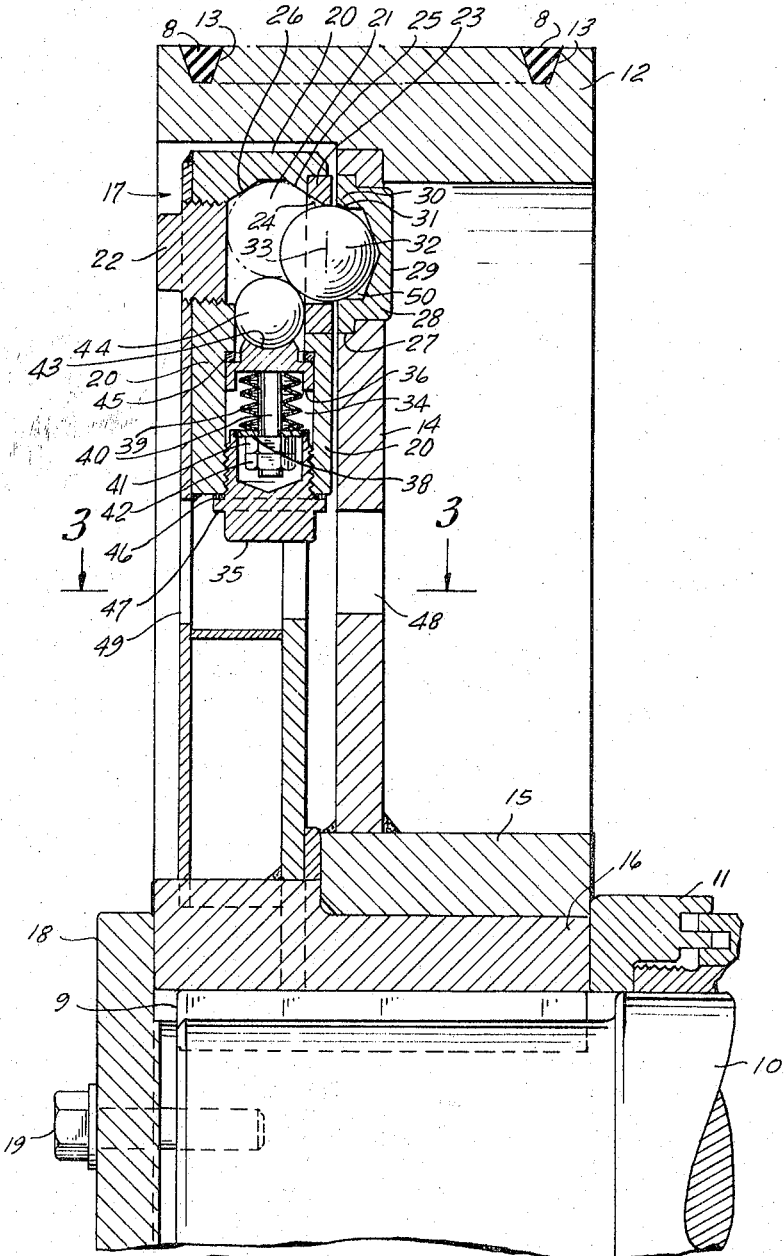
FIG. 1 is a sectional view through a transmission between a driving wheel and the driving shaft of a crusher constructed according to the invention.
Figure 3:
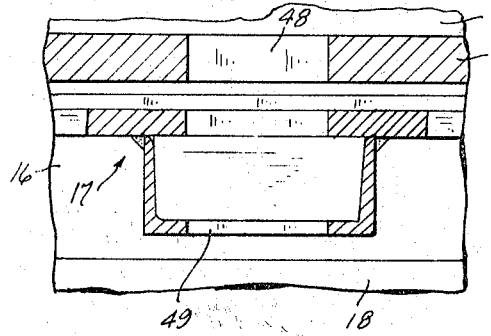
FIG. 3 is a sectional view on the line 3—3 of FIG. 1.

In the driving position of the parts as shown in FIG. 1 the lower end of the hollow plunger 36 is spaced away from the upper end of the hollow plug 35.

A stem 40 is secured to the lower end of the plunger 36 and passes through a hole in the cross member 38 and its threaded extremity is engaged by an adjusting nut 41 and lock nut 42. Thus by adjusting the nuts the pressure between the two balls 32, 44, in the drive position, due to the spring washers 39 may be adjusted.

Shims 45 are arranged between shoulders formed on the plunger 36 and in the bore 34 in the block 20, and other shims 46 are provided between the lower end of the block 20 and a circular flange 47 formed on the hollow plug 35.

As best seen in FIG. 2 indicating marks 52 are formed on the rim 12 of the fly wheel and on the outer end of the arm 17 which marks, when in line, indicate that the two sockets 21 and 50 are in register.

The operation of the device is as follows:

Assuming the balls 32 and 44 have been assembled in the positions shown in FIG. 1 and the apparatus is started up, should an excessive torque be transmitted to the shaft 10, or an excessive resistance encountered, the ball 32 is forced by the truncated conical face 31 towards the socket 21 and in so moving depresses the ball 44 against the action of spring washers 39. This movement of the ball 32 is assisted by centrifugal force upon it, thus the mass of the ball 32 and the resistance to movement of the ball 44 by the spring washers 39 are so selected that at a predetermined torque being transmitted by the ball 32 it can pass completely into the socket 21 thus permitting relative rotation between the driving fly wheel and the shaft 10.

The shape of the walls 25 and 26 of the socket 21 are such that the ball 32 is retained in the socket under the action of the spring pressed detent ball 44.

In order to reset the mechanism after a disengagement the plug 22 is removed, the marks 52 are brought into register, and the ball 32 is pushed back by a suitable drift into the position shown in FIG. 1, whereupon the plug 22 is reintroduced.

As previously indicated the kinetic energy stored up in the ball 32 when it is forced rapidly into the socket 21 is dissipated by reason of the frictional resistance between the two balls 32 and 44.

The above arrangement is suitable for driving transmissions for various forms of crushers such as rotary crushers, jaw crushers and gyratory crushers.

I claim:

1. In a mechanical transmission, including two relatively rotatable coaxially mounted members, an overload release mechanism interconnecting said members located at a distance away from the axis of their rotation and comprising adjacent opposed registering and facing first and second sockets provided respectively in said coaxial members, a driver means located partially in each of said sockets coupling said members together and transmitting a drive from one of said coaxial members to the other during normal operation of the transmission, said first socket being adapted to receive only a portion of said driver means so that a reaction force is created between said first socket and the driver means tending to move the driver means therefrom into the second socket, and a yieldable detent member engaging the driver means and opposing said reaction force, said detent member being located in a position to oppose movement of said driver means from said first socket into said second socket and being yieldable upon the occurrence of a predetermined increased value of said force thereby permitting the driver means to move out of said first socket, wherein the improvement comprises a construction in which said first socket, which is adapted to receive only a portion of said driver means, is provided with a mouth shaped in such a manner that the reaction force between it and the driver means tends to move the driver means from said first socket into the second socket, wherein the second socket includes a cavity located opposite the detent member and offset with respect to the mouth of said second socket into which the driver means is moved and therein retained by the detent member when the driver means is moved from the first socket into the second socket and said coaxial members are uncoupled, and wherein said detent member is located radially inwardly of said driver means.

2. A mechanical transmission according to claim 1, wherein the driver means is a driver ball and the detent member is a ball supported in a cup-shaped depression seat at the end of a spring pressed plunger which forces the detent ball into engagement with the driver ball, the arrangement being such that the movement of the driver ball out of the first socket towards the second socket tends to rotate both balls, which rotation is opposed by the frictional engagement between the detent ball and said cup-shaped seat and betwen the two balls themselves, whereby the kinetic energy of the driver ball by reason of its movement from the first socket is largely absorbed.

3. A mechanical transmission according to claim 1, wherein the driver means is a ball, and that the opposite side of said second socket has a groove the bottom of which is inclined away from the axis of rotation as it extends away from the mouth of said second socket along which groove the driver ball may move under the action of centrifugal force so that the greater part of the driver ball may be located in said second socket.

4. A mechanical transmission according to claim 1, wherein means is provided in the member containing said second socket for gaining access to the driver means after uncoupling said coaxial members for the purpose of returning it to its driving position when the sockets are brought into register.

5. A mechanical transmission according to claim 4, wherein the driver means is a ball and the two coaxial members and parts moving therewith are provided with indicating means for facilitating the bringing of the two sockets into register and for manually resetting the driver ball therein.

6. A mechanical transmission according to claim 1, wherein one of said coaxial members is a fly wheel having a rim and the other coaxial member comprises an arm extending radially along the fly wheel and terminating within the border of and adjacent to the rim of the fly wheel.

References Cited by the Examiner

UNITED STATES PATENTS

| | | | |
|---|---|---|---|
| 1,579,057 | 3/1926 | Ashbury | 64—29 |
| 2,429,091 | 10/1947 | Dodge et al. | 192—104 |
| 2,493,232 | 1/1950 | Dodge | 192—104 X |
| 2,514,227 | 7/1950 | Dodge | 192—104 |
| 3,252,303 | 5/1966 | Weasler et al. | 64—29 |

DAVID J. WILLIAMOWSKY, *Primary Examiner.*

BENJAMIN W. WYCHE III, *Examiner.*